United States Patent
Whaley et al.

(10) Patent No.: US 7,399,125 B1
(45) Date of Patent: Jul. 15, 2008

(54) LENS ARRAY WITH INTEGRATED FOLDING MIRROR

(75) Inventors: Gregory J. Whaley, Woodbury, MN (US); Roger J. Karnopp, Eagan, MN (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 11/493,072

(22) Filed: Jul. 26, 2006

(51) Int. Cl.
*G02B 6/36* (2006.01)

(52) U.S. Cl. .............................. 385/92; 385/88; 385/93

(58) Field of Classification Search .................... 385/92
See application file for complete search history.

(56) References Cited

U.S. PATENT DOCUMENTS

| | | | |
|---|---|---|---|
| 4,810,052 A | 3/1989 | Fling | |
| 5,455,703 A | 10/1995 | Duncan et al. | |
| 6,865,346 B1 | 3/2005 | Miller et al. | |
| 6,985,674 B2 | 1/2006 | Heineke et al. | |
| 2002/0027689 A1 | 3/2002 | Bartur et al. | |
| 2002/0076173 A1* | 6/2002 | Jiang et al. | 385/92 |
| 2002/0131725 A1 | 9/2002 | Ahrens | |
| 2004/0202477 A1* | 10/2004 | Nagasaka et al. | 398/138 |
| 2004/0234210 A1* | 11/2004 | Nagasaka et al. | 385/88 |

* cited by examiner

*Primary Examiner*—Hemang Sanghavi
*Assistant Examiner*—Kajli Prince
(74) *Attorney, Agent, or Firm*—Larkin Hoffman Daly & Lindgren Ltd.; Craig J. Lervick, Esq.

(57) ABSTRACT

A fiber optic transceiver incorporating a lens array with an integrated mirror and method of creating the same is disclosed. The transceiver includes the lens array and transceiver housing used to convert optical signals to electrical signals. The lens array includes a fiber side that can be connected to a fiber optic connector. The lens array also has a device side that can be connected to a photodetector. The lens array also includes a mirror that is positioned to transmit an optical signal received from the fiber side to the device side. Both the fiber side and the device include lenses used to provide focused transmission of optical signals. Accordingly, optical signals can be transmitted from a fiber optic connector to a photodetector in a compact and efficient manner at high bandwidths.

6 Claims, 10 Drawing Sheets

LENS ARRAY WITH INTEGRATED FOLDING MIRROR

BACKGROUND OF THE INVENTION

The present invention relates to a fiber optic transceiver having efficient connection structure. More specifically, the present invention relates to a fiber optic transceiver assembly that receives and transmits at faster data rates while reducing signal loss by incorporating a compact lens array having an integrated folding mirror.

Modern fiber telecommunication and data communication systems use transmitter/receiver components, commonly known as transceivers. As is well known, fiber optic transceivers facilitate bi-directional signal transmissions between electronic devices and fiber optic system components. The transceivers include photodetectors, which convert received optical signals to electric signals which can then be used by many electronic devices. Photodetectors are typically positioned at the receiving end of the fiber optic data, video, or audio link. The most common photodetector is the semiconductor photodiode, which produces current in response to incident light. In addition, the transceivers also include transmitter components which produce optical signals. The transmitter portion may include light emitting diodes, laser diodes, or similar components to produce optical signals in response to provided electrical signals. Coupling optical signals into and out of an optical fiber often requires the use of precise optical components to ensure efficient signal transfer. Unfortunately, these optical components are potential sources of signal loss due to contamination or imperfections.

Demand for bandwidth in fiber communication systems is limitless. From economic and practical perspectives, it is desirable to minimize the size of all fiber optic components in the system. In fact, certain systems, such as those used for data transmission networks, equipment used for national defense, and the like, require compact yet efficient fiber optic components. As such, it is beneficial to reduce the size of components, provide the most efficient system layout, and eliminate unnecessary parts. Simply stated, there exists a need for a compact fiber optic transceiver assembly that reliably performs at high data rates.

The efficient connection of fiber optic cables is important in maintaining this efficient operation. To maintain this efficient operation, it is desirable to avoid unnecessary bending or twisting of optical fibers. Thus, the geometry of the fiber connections is also important. Because connections are made directly to the transceiver, this geometry also affects the length of electrical connections mentioned above.

It is commonly known that, both optical and electrical signal losses increase as the number of components and connections in a fiber optic system are increased. These signal losses are very critical given the high frequency at which these systems operate. Light sources, such as lasers, and/or optical detectors are often connected to an electric amplifier which has electrical leads. These connections can be a source of signal loss, and often result in reductions in performance because of the electrical lead lengths. Accordingly, it would be very beneficial to provide fiber optic transceiver assembly that does not require long electrical leads between the optoelectric components and related electronic amplifiers.

Despite efforts by fiber optic transceiver manufacturers to standardize and minimize fiber optic transceivers, there still exists a need for a compact fiber optic transceiver assembly that performs at high data rates. In addition, there exists a need for a fiber optic transceiver assembly that efficiently and compactly couples optical signals from a standard fiber array connector to a transceiver without bending fiber optic cables. There also exists a need for a fiber optic transceiver assembly that allows for reduced length of electrical leads between the laser or detector photodiode, and the related amplifiers.

BRIEF SUMMARY OF THE INVENTION

In light of the aforementioned problems, it is one object of the present invention to provide a lens array that permits the creation of a multi-channel fiber optic transceiver assembly that is substantially smaller than previous assemblies while allowing for performance at high data rates and optimum cable routing. A second object of the present invention is to eliminate long electrical leads between the lasers or detectors of the transceiver and the related amplifier chips thereby allowing data to be transmitted at higher data rates while reducing signal loss. A third object of the present invention is to provide better compatibility for standard pick and place automated assembly and manufacturing practices thus lowering costs.

The present invention provides the aforementioned advantages and more by incorporating a unique coupling technique between the fiber and the transceiver. More specifically, the present invention includes a lens array having a fiber side connected to a fiber optic connector, a device side attached to a transceiver and a coupling mirror that accommodates optical transmission between the fiber and device sides. The lens array also has a back side configured to appropriately position the mirror surface and achieve the desired redirection of optical signals. As described in further detail below, the fiber side and device of the lens array are oriented perpendicular to one another. As such, in the preferred embodiment, the mirror will be positioned at 45 degrees relative to those sides in order to accommodate signal transmission.

The fiber side of the lens array includes at least one fiber side lens used to receive or transmit an optical signal to/from the fiber optic cable. In the preferred embodiment, a ribbon cable is used, thus a plurality of lenses are necessary. As mentioned above, the mirror side includes a reflective surface positioned diagonally relative to both the fiber side and the device side, where the mirror surface is used to appropriately direct the optical signal to/from the fiber side lens. In a similar manner, the device side also includes a device side lens to receive/transmit the optical signal transmitted to/from the mirror. Again, a number of device side lenses are used in the preferred embodiment. The transceiver assembly, in accordance with the present invention, also includes a transceiver housing used to house the components necessary to achieve the desired optical/electrical conversion. For example, the housing will accommodate the optical elements (i.e., photodetectors, light sources) which are positioned immediately adjacent to the lens array. The transceiver housing also includes additional components (a microprocessor, amplifiers, capacitors, etc.) used in the conversion of the optical signal to an electrical signal, or visa versa.

Due to the positioning of components in the transceiver assembly, many of the above-mentioned advantages are obtained. Easy connection to the fiber optic cable is achieved due to the configuration of the lens array. Further, efficient coupling to the optoelectric components is achieved in a manner that avoids long lead/cable length. This is made possible due to the placement of these optoelectric components directly on the circuit board, and the positioning of the lens array directly there above.

DETAILED DESCRIPTION OF THE INVENTION

Figure 1:
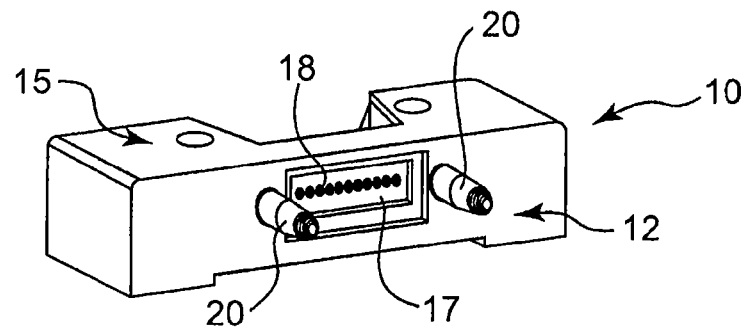
FIG. 1 is a perspective view of a fiber side of a lens array in accordance with the present invention.
Figure 2:
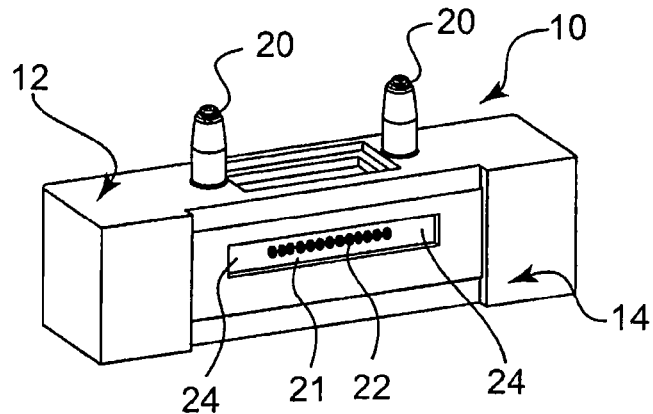
FIG. 2 is a perspective view of a device side of the lens array.
Figure 3:
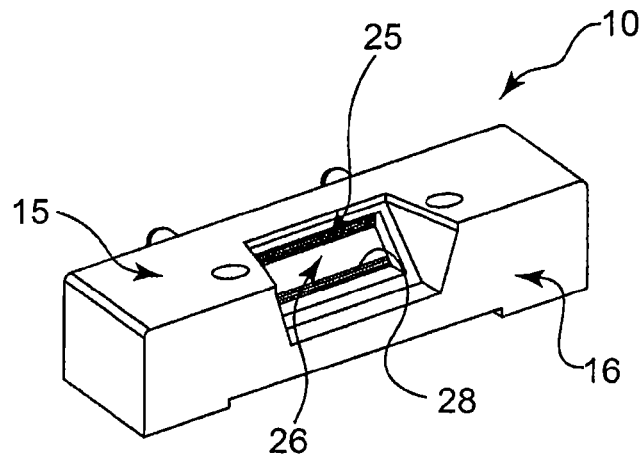
FIG. 3 is a perspective view of a mirror side of the lens array.

Referring now to FIGS. 1-3 there is shown a lens array 10 in accordance with the present invention. Lens array 10 is depicted as a substantially rectangular component, which includes a fiber side 12, a device side 14 and a back side 16. In addition, lens array 10 includes a top side 15 (as more specifically shown in FIG. 7). Those skilled in the art can appreciate that the size and shape of lens array 10 can be varied depending on the type of fiber optic connector and/or device to which it is coupled. In one embodiment of the present invention all non-critical surfaces of lens array 10 have a frosted or otherwise textured surface to facilitate adhesion of lens array 10 to other components in a fiber optic transceiver assembly.

Figure 4:
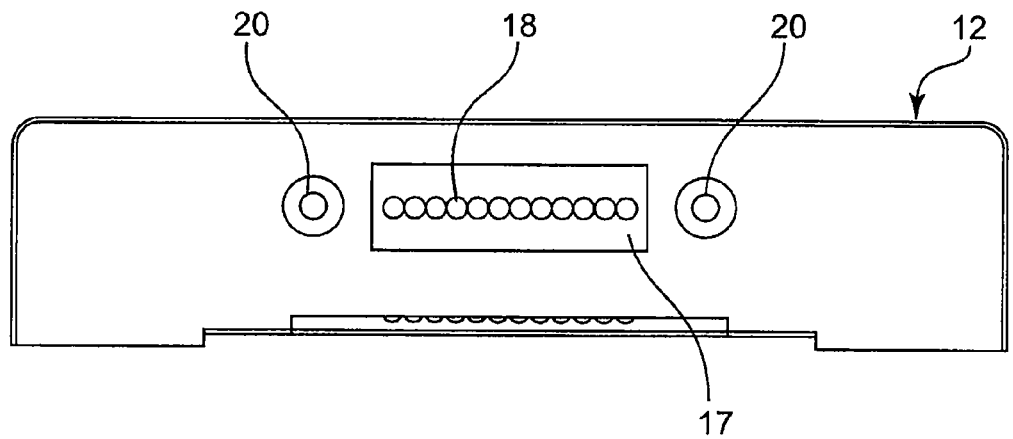
FIG. 4 is a front view of the lens array shown in FIG. 1.

Fiber side 12 is shown in greater detail in FIG. 4. Fiber side 12 has a connector receptacle 17 with a plurality of fiber side optical openings 18. FIG. 4 depicts a total of twelve fiber side optical openings 18; however those skilled in the art can appreciate that the size/shape of connector receptacle 17 and the number of fiber side optical openings 18 can vary in different fiber optic systems depending on type of fiber optic cable or the type of connector used. Many different types of connectors are presently used for fiber-to-fiber and fiber-to-component connections, including FC, fiber distributed data interface (FDDI), LC, MT Array, subscription channel (SC), SC Duplex and straight tip (ST) connectors. These different types of connectors are used in varying applications based upon their unique performance and overall characteristics. Structures on fiber side 12 will be specifically configured to cooperate with the type of connector being used. As shown in FIG. 4, fiber side 12 further has connecting pins 20 used to attach a fiber optic connector 62 more completely (shown in FIG. 14) to lens array 10.

Figure 5:
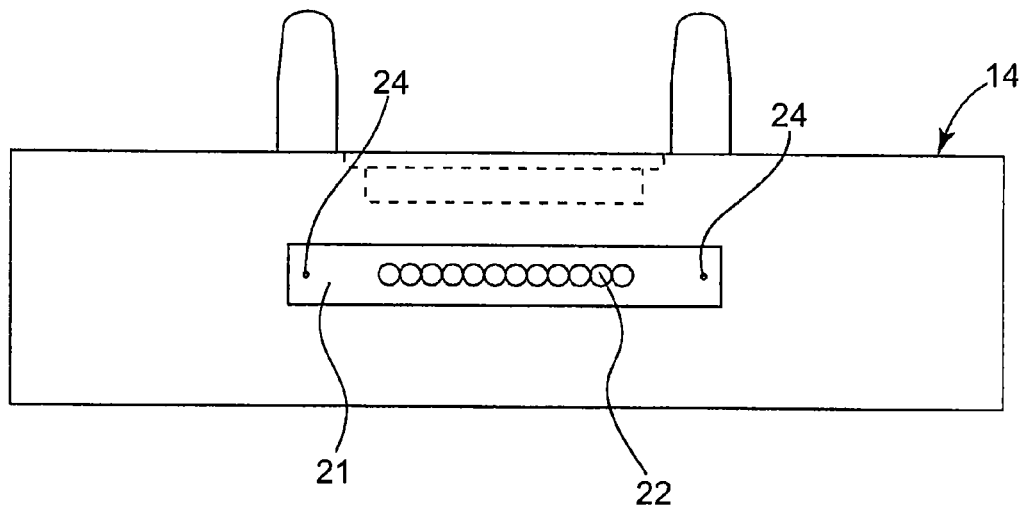
FIG. 5 is a front view of the device side of FIG. 2.

FIG. 5 shows a front view of lens array 10 in greater detail. Device side 14 has a device receptacle 21 with a plurality of device side optical openings 22. Again, those skilled in the art can appreciate that the shape and size of device receptacle 21 and the number of device side optical openings 22 can vary in different fiber optic systems depending on type of fiber optic cable, type of connector, type of device and the like. Those skilled in the art can also recognize that there are several different types of electro-optic components, including but not limited to, PIN photodiodes, avalanche photodiodes, LEDs, lasers, vertical cavity surface emitting lasers (VCSEL), and the like. The selection of particular components will depend on spectral characteristics of both the fiber optic system and the optical elements. Device side 14 also includes alignment fiducials 24 used to secure lens array 10 to the related optical components of a transceiver assembly (shown in FIG. 11).

Figure 6:
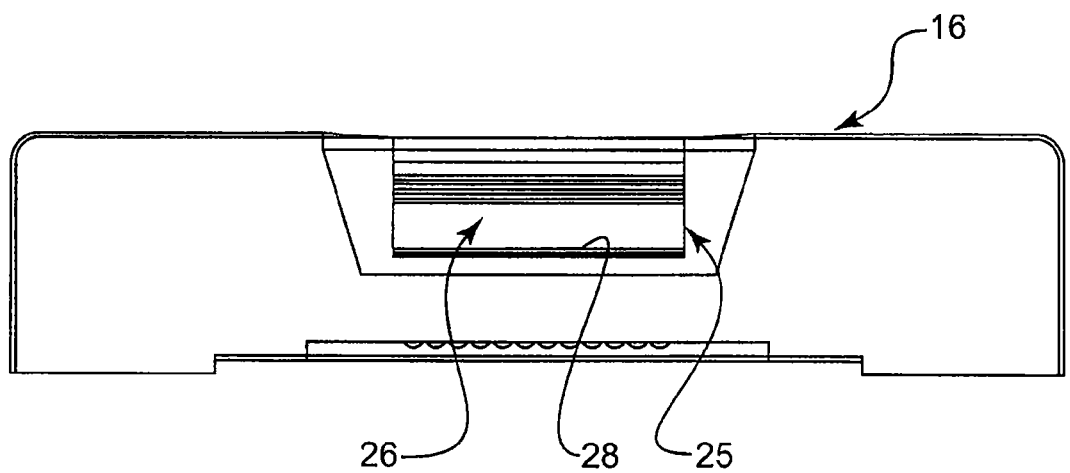
FIG. 6 is a back view of the lens array of FIG. 3.
Figure 7:
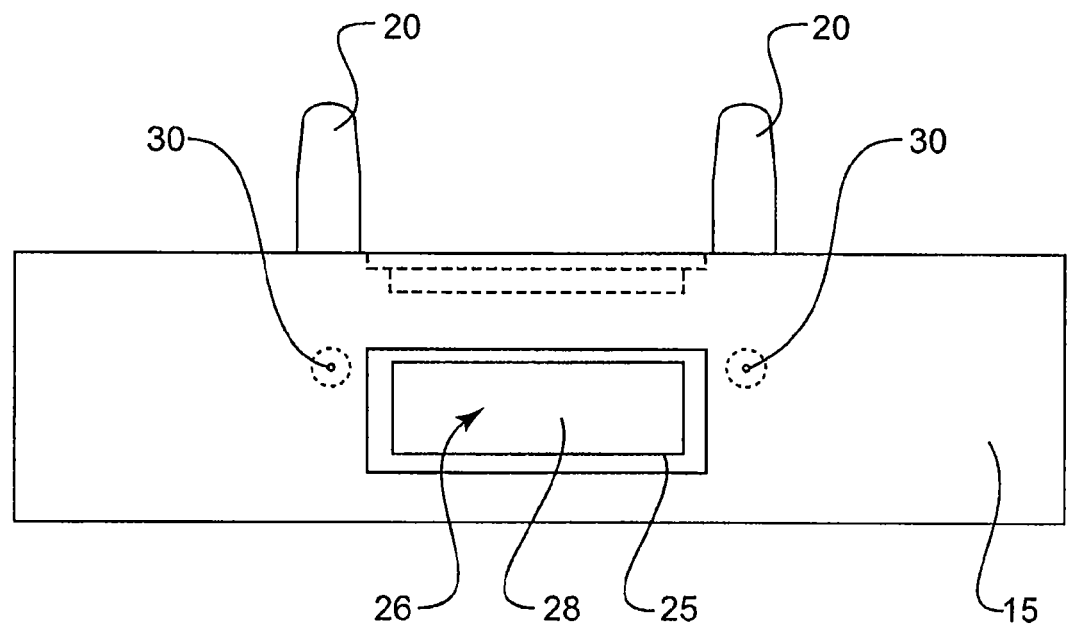
FIG. 7 is a top view of the lens array of FIG. 3.

FIG. 6 shows mirror side 16 in greater detail, while FIG. 7 shows top side 15 in greater detail. As will be discussed in further detail below, a mirror surface 26 is created at this location which will provide an internal reflective surface for the optical signals being transmitted through lens array 10. The material/air interface at mirror surface 26 provides sufficient internal reflectance to cause optical signals to be appropriately redirected. Top side 15 also includes alignment sites 30 provided for viewing alignment features when coupling lens array 10 with a photodetector 52 and a fiber optic connector 62. Alignment sites 30 are constructed of any optically clear substance that permits light transmission.

Figure 8:
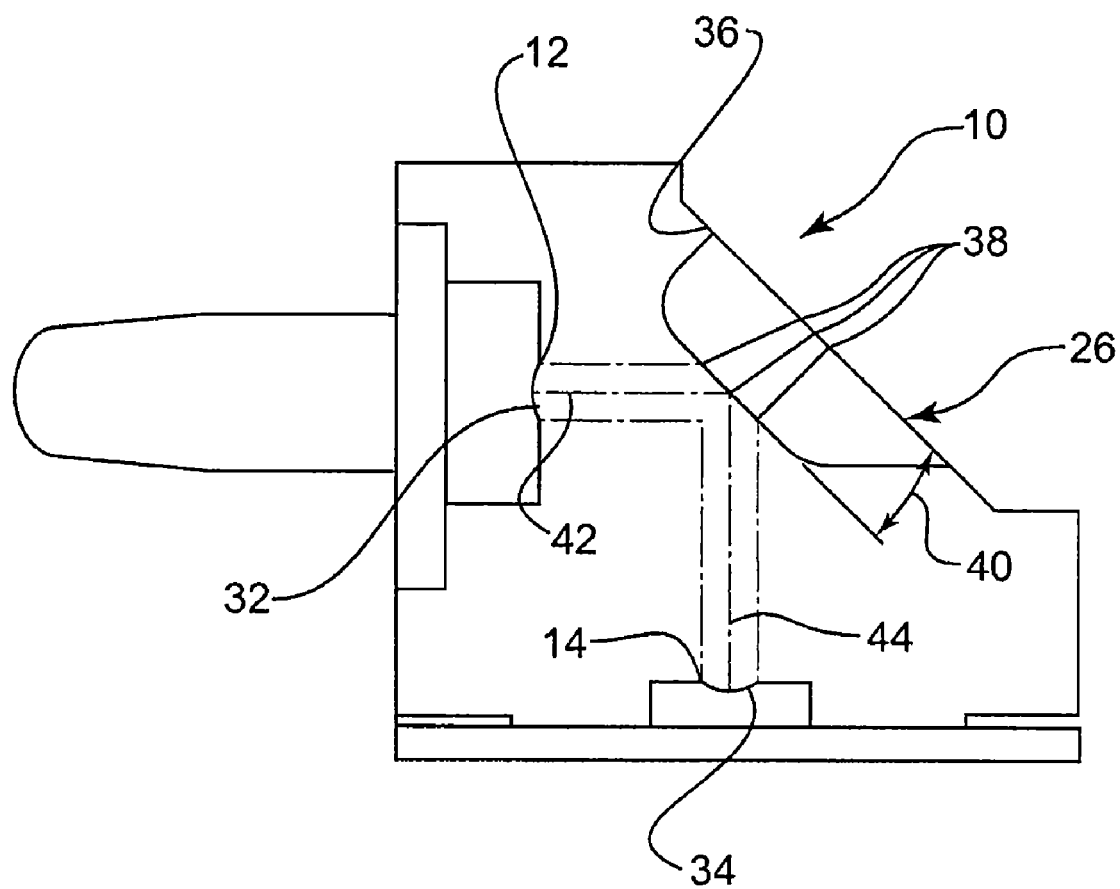
FIG. 8 is a cross sectional view of the lens array.

Referring now to FIG. 8 there is shown a cross sectional illustration of lens array 10 in accordance with the present invention. Fiber side 12 has a fiber side lens 32 positioned in opening 18 of lens array 10. Similarly, device side 14 has a device side lens 34 which is positioned in opening 22 of the lens array 10. As can be appreciated, both fiber side lens 32 and device side lens 34 are formed during the molding of lens array 10. Alternatively, these could be separately formed components. Fiber side lens 32 and device side lens 34 are constructed from any heat-resistant amorphous polymeric material available for injection molding, including but not limited to amorphous polyetherimides, polyimides, polycarbonates, polymethyl methacrylate (PMMA), and the like. Mirror surface 26 is positioned at a particular angle of reflection 40 with respect to the fiber side optical path or optical axis 42. A reflective area 38 on reflective surface 26 provides 100% reflection for all optical signals in this area. FIG. 8 shows an angle of reflection 40, or the angle between fiber side optical signal axis 42 and reflective surface 26 (and the mounting surface 39 of lens array 10), is a 45° angle to achieve a 90° redirection of the optical signal. Those skilled in the art can appreciate that the angle of reflection 40 can change depending on the position of fiber side 12 with respect to device side 14 in order to provide proper transmission of an optical signal along device side optical axis 44, and subsequently to device side lens 34.

Figure 9:
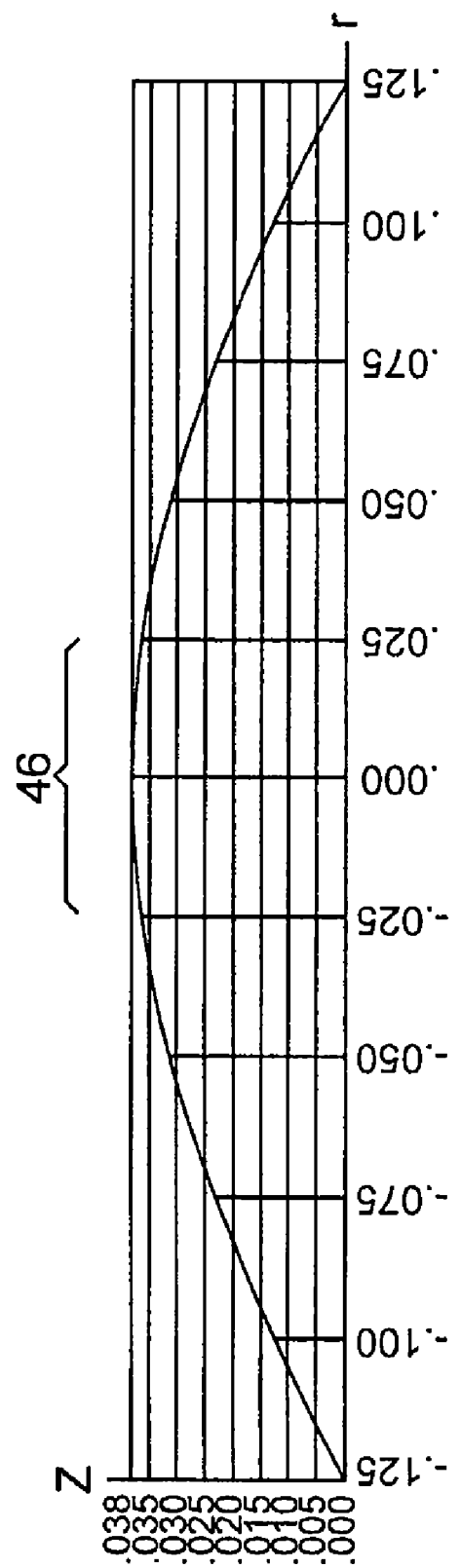
FIG. 9 is a detailed view of a device side lens in accordance with the present invention.
Figure 10:
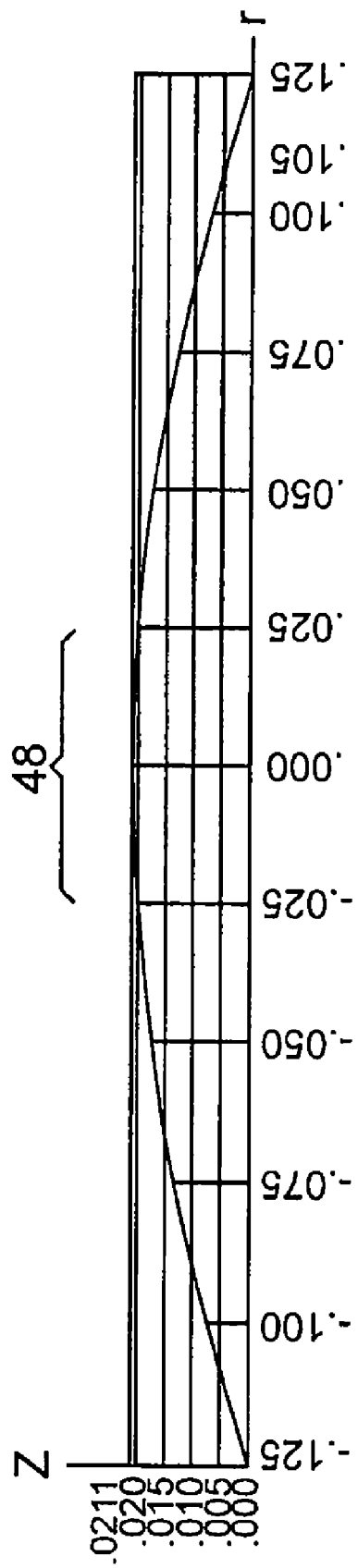
FIG. 10 is a detailed view of a fiber side lens in accordance with the present invention.

FIG. 9 depicts detailed dimensions of device side lens 34 as used in one embodiment. A signal area 46 for signals transmitted between mirror surface 26 and device side lens 34 is preferably within a 250 µm diameter around a middle of device side lens 34. Referring to FIG. 10, a similar illustration of fiber side lens 32 is shown. A signal area 48 of optical signals transmitted between fiber side lens 32 and mirror surface 26 is also preferably within a 250 µm diameter around a middle of fiber side lens 32. While FIGS. 9 and 10 shows particular curvatures for device side lens 34 and fiber side lens 32, respectively, those skilled in the art will recognize that various lens curvatures can be used depending on the specific characteristics of the fiber optic system.

Figure 11:
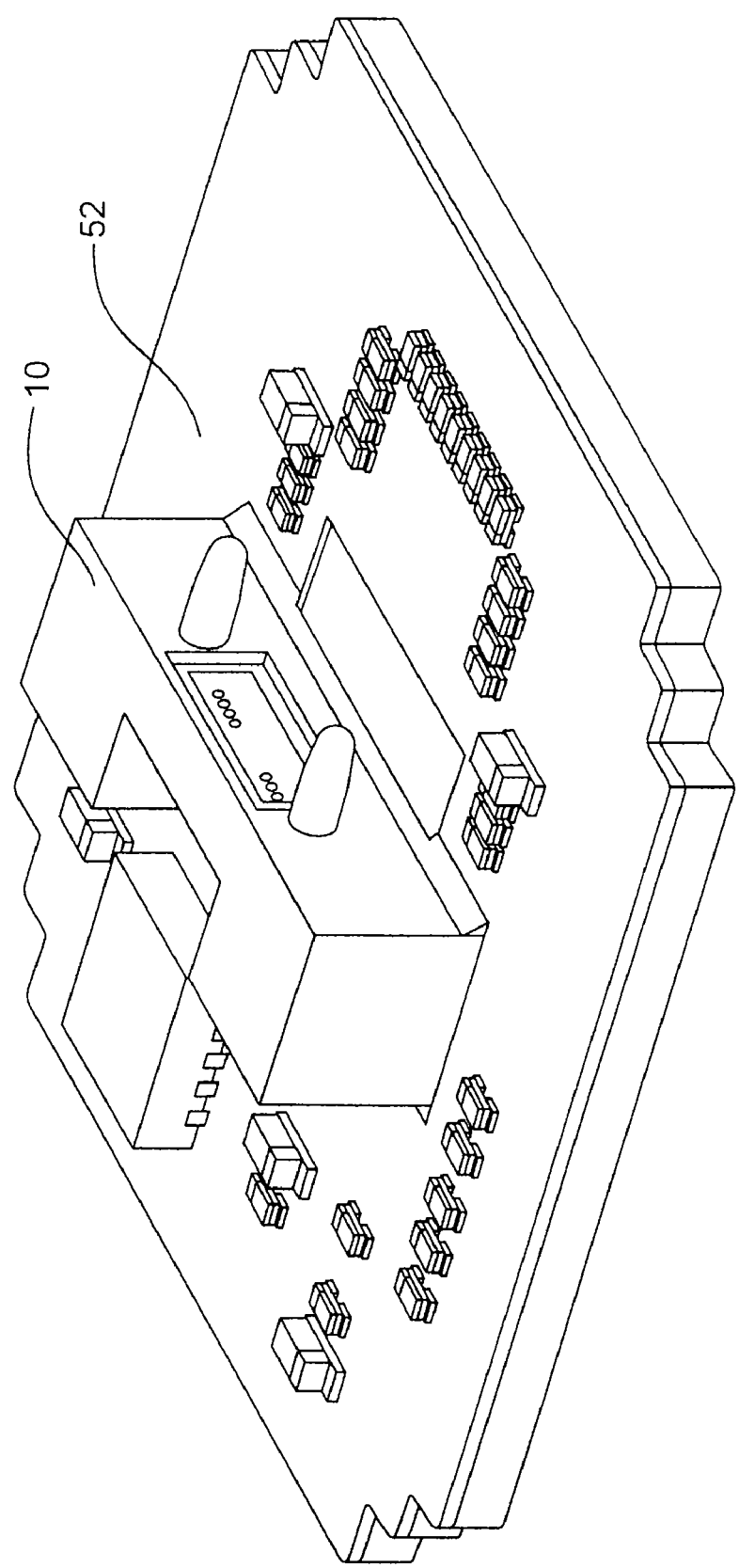
FIG. 11 is a side perspective view of the lens array in accordance with the present invention as it is mounted on an interposer and die.

Now that each component of the present invention has been discussed, following is a discussion of the assembly and operation of a fiber optic transceiver 50 incorporating lens array 10 in accordance with the present invention. Referring to FIG. 11, in one embodiment of the present invention, lens array 10 in accordance with the present invention is incorporated into transceiver 50 by attaching device side 14 of lens array 10 to an operative transceiver surface 52 via device receptacle 21, where operative transceiver surface 52 can be an interposer (not shown) and a die (not shown), such as a vertical cavity surface emitting laser (VSCEL) and a photodiode array die as commonly known in the art. While the figures depict the operative transceiver surface 52 as a photodiode, those skilled in the art recognize that many configurations are possible including combinations of surface illuminated or substrate illuminated photodiodes, phototransistors, and surface or substrate emitting, LEDs, VSCELs, edge emitting laser diodes, and the like.

Figure 12:
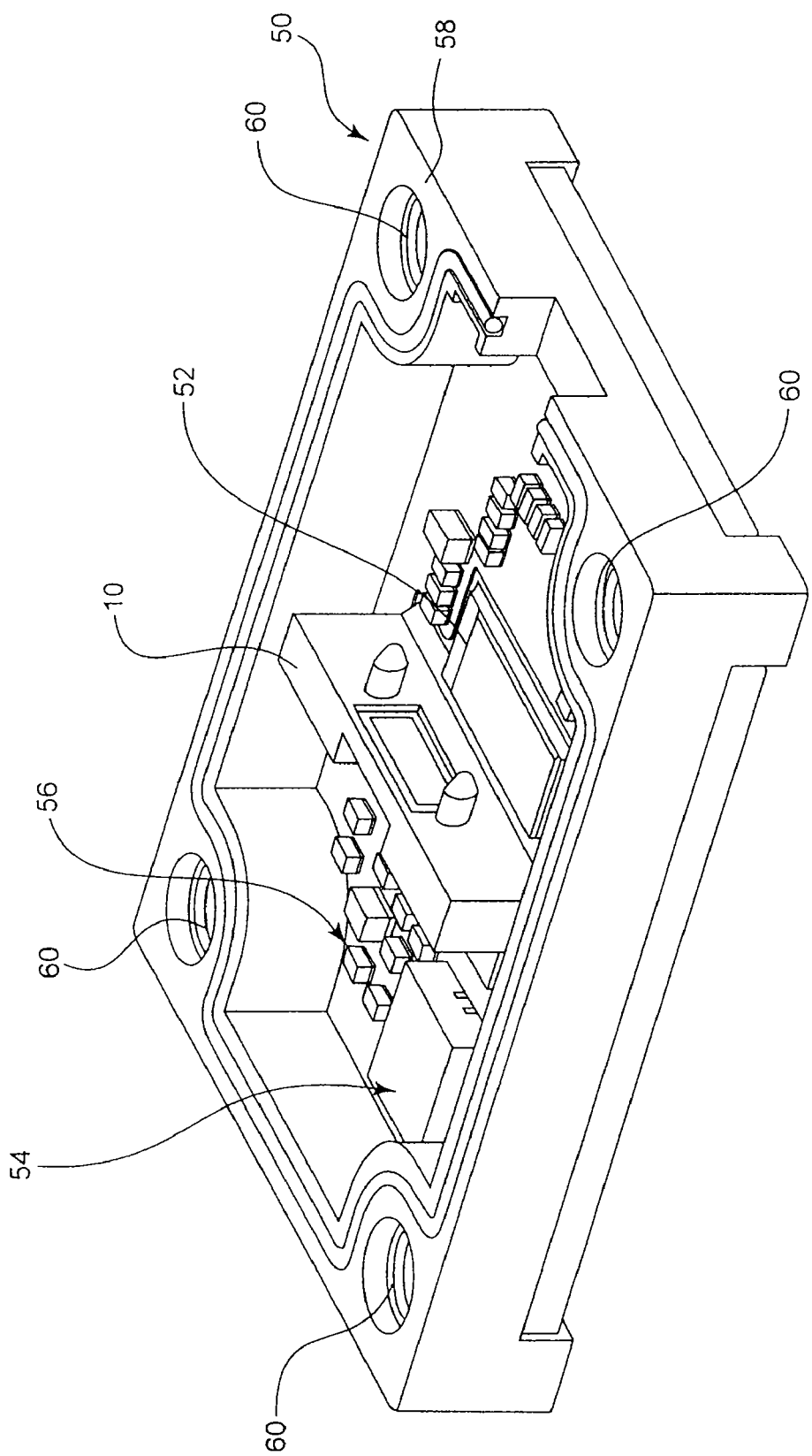
FIG. 12 is a side perspective view of a fiber optic transceiver incorporating the lens array in accordance with the present invention.

Referring now to FIG. 12, lens array 10 and a circuit board attached to transceiver surface components 52 are inserted into a transceiver housing 58 which also includes a microcontroller 54 capacitors 56 and amplifiers (not shown). Transceiver housing 58 includes mounting openings 60 whereby transceiver 50 can be mounted within a fiber optic system. As will be easily appreciated, the above mentioned components within housing 58 help to provide efficient operation of transceiver 50 by providing additional functions, such as filtering, signal conditioning, amplifying, gain adjusting, etc.

Figure 13:
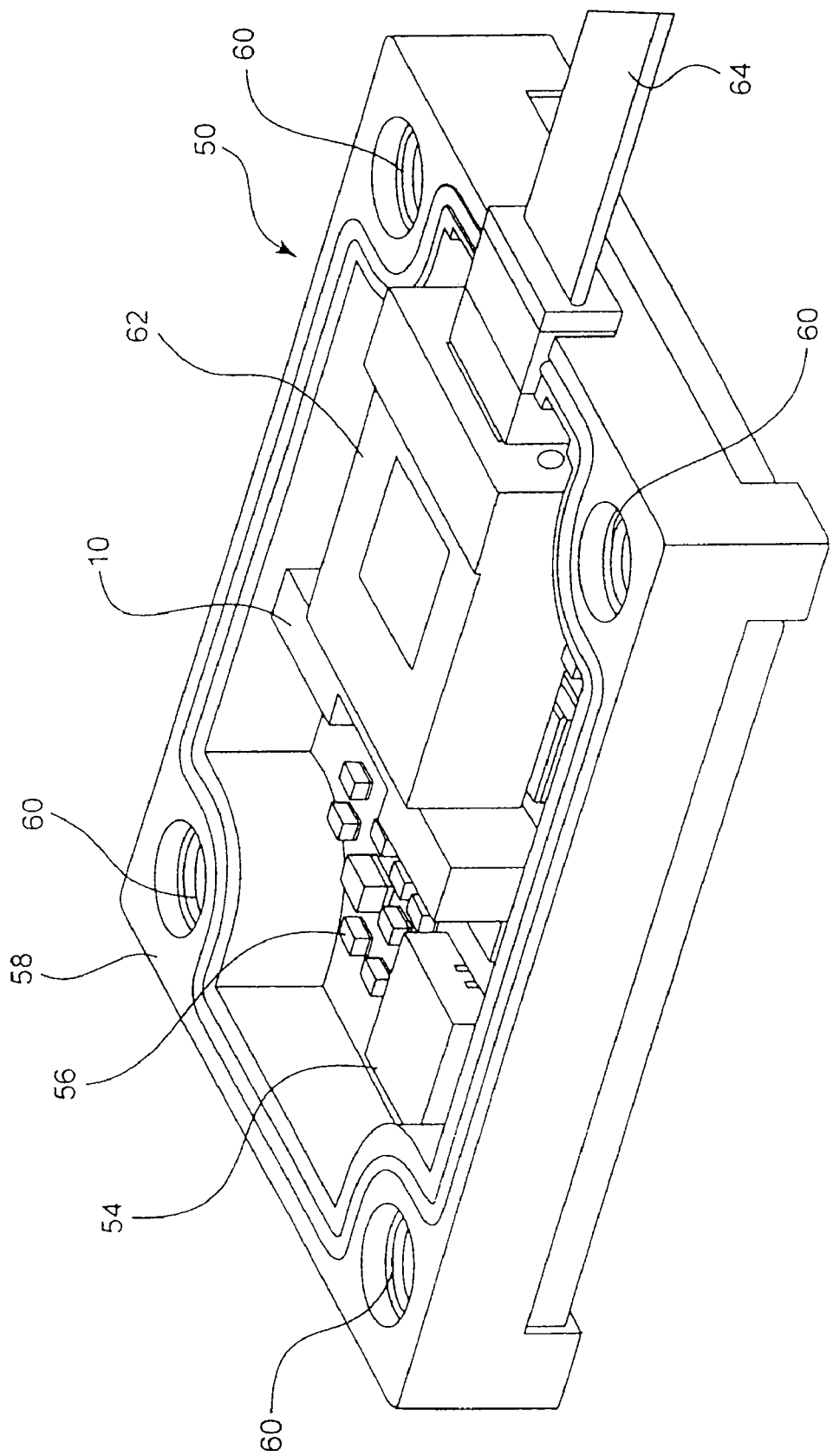
FIG. 13 is side perspective view of the fiber optic transceiver of FIG. 12 connect to a fiber optic cable with an MT ferrule.

FIG. 13 illustrates a fiber optic connector 62 which is inserted into transceiver casing 58 via connector receptacle 17 in order to secure fiber optic connector 62 to lens array 10. In this manner, a fiber optic cable 64 carrying optical signals is coupled to lens array 10. As can be seen, this connection does not require bending or twisting of fiber optic cable 64. Again, this helps to maintain efficient operation. In addition, a "compact package" results after the connection is made, meaning that optical signals do not have to travel great distances to reach the sensitive surfaces of transceiver 50. Further, all electrical components are close to one another, thus eliminating long lead lengths.

Figure 14:
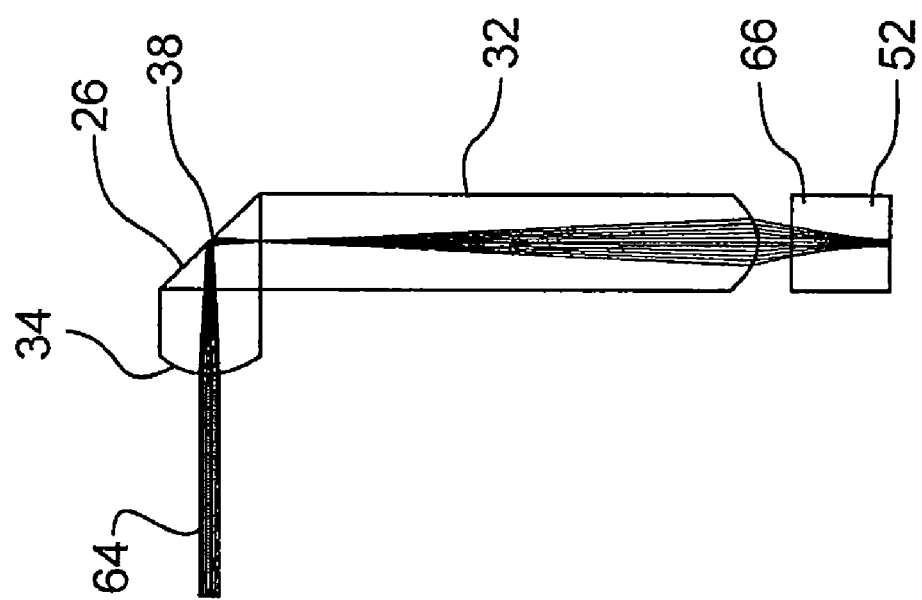
FIG. 14 is a cross section of a single transmission path within the lens array.

An example of one transmission path within lens array 10 is shown in FIG. 14. Here, an optical signal is carried by fiber optic cable 64 to fiber side lens 32. Preferably, optical signal 42 is received at and emitted from within a 25 μm radius and collected by the fiber side lens 32 as previously discussed in relation to FIGS. 8-10. Optical signal 42 then travels to reflective surface 26, and is redirected. Upon reflection off reflective surface 26, the optical signal travels to device side lens 34. Again, referring to FIGS. 8-10, it is preferable for optical signal 46 to be directed to within a 10 μm radius at the point of focus of device side lens 34. While the above discussion involves transmission from the fiber to the transceiver, in actual use signals will be transmitted in both directions. Thus, the transmit mode will cause optical signals to travel in the opposite direction. As also shown in FIG. 14, this particular embodiment transmits the optical beam through the transparent substrate 66 of the transceiver chip, in this case is made of sapphire but could be silicon or other material substantially transparent to the signal beam 44. Other embodiments could focus the optical beam 44 directly on the emitting/detecting surface 52.

The aforementioned components of fiber optic transceiver 50 in accordance with the present invention can be attached to one another with techniques commonly known in the art, including but not limited to mechanical fastening, soldering, thermo-compression bonding, adhesives and epoxies, and the like.

As discussed above, the lens array 10 of the present invention utilizes a reflective surface 26 to accomplish the desired redirection of optical signals. This type of "mirror" is known by those skilled in the art as a totally internal reflecting (TIR) mirror. In this structure, light transmitted inside a material which is incident to a smooth outer surface, will be totally reflected off that surface, rather than transmitted through the air on the opposite side of the surface. This characteristic is created by designing an appropriate angle of reflection, and appropriately selecting materials. Specifically, the angle of reflection must be shallow enough, and the material index of refraction large enough for this internal reflection to occur. Thus, utilizing the angled reflective surface 26 of the present invention, and appropriate materials making up lens array 10, this TIR mirror structure is achieved. Naturally, different structures could be utilized. For example, if the refractive index of the various materials was not appropriate, a more classical mirror could be attached to reflective surface 26, to achieve the desired reflection of optical signals. Naturally, polished or further processed surfaces could also be utilized to cause reflection at reflective surface 26. While the preferred embodiment includes the TIR mirror, each of these other options are considered to be within the scope of the present invention.

In addition to the variations discussed above, it is not necessary for reflective surface 26 to be entirely flat. As will also be anticipated by those skilled in the art, reflective surfaces having various curves or contours may be utilized to appropriately redirect optical signals in a desired manner. As such, the present invention is not intended to be limited to flat mirrors and/or reflective surfaces, but also includes contoured or curved surfaces.

As mentioned above, a TIR mirror is contemplated in the preferred embodiment. One potential concern for such a mirror is the contamination or interference caused by moisture build-up. To alleviate this concern, the lens array 10 of the present invention may include a protective cover on reflective surface 26. The protective cover may exist immediately on the back of reflective surface 26, or may create an air gap behind this surface. In this way, the possibility of moisture developing on reflective surface 26 is eliminated, and the reflective characteristics can be maintained. This same concept could also easily be utilized at the input/output interfaces. (i.e., device side lens 34 and fiber side lens 32). Specifically, a gap or window could be created adjacent to fiber side lens 32 to create isolation and avoid the possibility of condensation building up upon these surfaces as well. In this case, the fibers themselves would be placed in direct contact with these windows, thus avoiding any possibility of condensation being created at that interface. Similar structures could easily be created adjacent device side lens 34.

To further clarify the nature of the preferred embodiment, it should be made clear that the lens array 10 of the present invention is contemplated to be a single molded part. In the molding process, appropriate lenses and surfaces are created to accommodate the receipt and transmission of optical signals using material with appropriate optical transmission characteristics. More specifically, the material is optically transmissive in order to accommodate the functions outlined above. Within the body of lens array 10, free space transmission of signals is utilized. Stated alternatively, each of the signals received at the various lens are not contained or otherwise isolated within lens array 10. Rather, the signals are appropriately directed and reflected by the lens and reflective surfaces themselves in order to achieve desired operation. As contemplated, this requires appropriate alignment and positioning of the various lenses and reflective surface 26, in order to achieve this function. Naturally, the material chosen is also preferably moldable, to achieve appropriate molding and formation of the desired lens product. In the preferred embodiment, this material is also tolerant to very high temperatures.

By being appropriately temperature tolerant, the lens array will be able to withstand subsequent manufacturing operations such as a reflow soldering processes, etc., once attached to a circuit board.

The invention has herein been described in its preferred embodiments to provide those skilled in the art with the information needed to apply the novel principles and to construct and use the embodiments. However, it is to be understood that the invention can be carried out by specifically different devices and that various modifications can be accomplished without departing from the scope of the invention itself, which is set out in the following claims:

What is claimed is:

1. A fiber optic transceiver assembly configured to support bi-directional communication of optical signals via a fiber optic cable to and from optical components of a transceiver, comprising:
a lens array comprising a fiber side operably coupled to a fiber optic connector, a device side operably coupled to the optical components of the optical transceiver, and a mirror surface in a predetermined orientation,
wherein the fiber side houses at least one fiber side lens positioned in an optical transmission path and configured to accommodate the two way communication of at least one optical signal between the fiber optic connector and the mirror surface, the at least one fiber side lens being configured such that substantially all of the at least one optical signal is transmitted within a 50 μm span at the point of focus of the fiber side lens;
wherein the device side houses at least one device side lens configured to accommodate the two way communication of the at least one optical signal between the device side and the mirror surface; and
wherein the predetermined orientation of the mirror surface allows the mirror to reflect optical signals such that the two way communication between the at least one device side lens and the at least one fiber side lens is achieved; and
a transceiver housing containing the optical components of the optical transceiver with the lens array attached thereto and further configured to accommodate the fiber optic cable connector.

2. A fiber optic transceiver assembly configured to support bi-directional communication of optical signals via a fiber optic cable to and from optical components of a transceiver, comprising:
a lens array comprising a fiber side operably coupled to a fiber optic connector, a device side operably coupled to the optical components of the optical transceiver, and a mirror surface in a predetermined orientation,
wherein the fiber side houses at least one fiber side lens positioned in an optical transmission path and configured to accommodate the two way communication of at least one optical signal between the fiber optic connector and the mirror surface;
wherein the device side houses at least one device side lens configured to accommodate the two way communication of the at least one optical signal between the device side and the mirror surface, the at least one device side lens being configured such that substantially all of the at least one optical signal is transmitted within a 10 μm diameter at the point of focus of the device side lens; and
wherein the predetermined orientation of the mirror surface allows the mirror to reflect optical signals such that the two way communication between the at least one device side lens and the at least one fiber side lens is achieved; and
a transceiver housing containing the optical components of the optical transceiver with the lens array attached thereto and further configured to accommodate the fiber optic cable connector.

3. A method of creating a fiber optic transceiver assembly configured to support bi-directional transmission of optical signals to and from a receiver and a transmitter, respectively, within a multi-channel optical transceiver via a fiber optical ribbon cable, comprising the steps of:
providing a lens array comprising a fiber side, a device side, and a mirror surface;
operably connecting the receiver and the transmitter of the optical transceiver to the device side of the lens array, wherein the device side of the lens array houses at least one device side lens positioned and configured to accommodate the bi-directional transmission of optical signals there through;
mounting the optical components and operably attached lens array in a transceiver housing, wherein the transceiver housing is configured to include electronics adapted to communicate electrical signals to and from the transceiver; and
operably connecting a fiber optic connector to the fiber side of the lens array,
wherein the fiber side comprises at least one fiber side lens configured to accommodate transmission and receipt of at least one optical signal between the fiber optic connector and the mirror;
wherein the mirror surface of the lens array is positioned diagonally relative to the device side and the fiber side, the mirror surface configured to reflect the at least one optical signal between the at least one fiber side lens and the at least one device side lens; and
wherein the at least one fiber side lens is configured such that substantially all of the at least one optical signal is transmitted within a 50 μm range at the point of focus of the at least one fiber side lens.

4. A method of creating a fiber optic transceiver assembly configured to support bi-directional transmission of optical signals to and from a receiver and a transmitter, respectively, within a multi-channel optical transceiver via a fiber optical ribbon cable, comprising the steps of:
providing a lens array comprising a fiber side, a device side, and a mirror surface;
operably connecting the receiver and the transmitter of the optical transceiver to the device side of the lens array, wherein the device side of the lens array houses at least one device side lens positioned and configured to accommodate the bi-directional transmission of optical signals there through;
mounting the optical components and operably attached lens array in a transceiver housing, wherein the transceiver housing is configured to include electronics adapted to communicate electrical signals to and from the transceiver; and
operably connecting a fiber optic connector to the fiber side of the lens array,
wherein the fiber side comprises at least one fiber side lens configured to accommodate transmission and receipt of at least one optical signal between the fiber optic connector and the mirror;
wherein the mirror surface of the lens array is positioned diagonally relative to the device side and the fiber side, the mirror surface configured to reflect the at least one optical signal between the at least one fiber side lens and the at least one device side lens; and wherein the at least one device side lens is configured such that substantially all of the at least one optical signal is transmitted within a 10 μm radius at the point of focus of the at least one device side lens.

5. A fiber optic transceiver means for converting an optical signal received via a fiber optic cable into at least one electrical signal and converting an electrical signal into an optical signal for transmission via the fiber optic cable, comprising:

a transceiver means for receiving and generating the optical signal, wherein the transceiver means comprises an electrical conversion means for converting the optical signal to the electrical signal, and wherein the transceiver means further comprises an optical conversion means for converting the electrical signal into the optical signal; and transmission means attached to the transceiver means and attached to the fiber optic cable, the transmission means having an integral fiber side focusing means positioned adjacent the fiber optic cable, an integral transceiver side focusing means positioned adjacent the transceiver means, and reflecting means positioned between the fiber side focusing means and the transceiver means, wherein the transceiver side focusing means is configured to receive the optical signal from the transceiver and focus it upon the reflecting means, and is further configured to receive the optical signal from the reflecting means and direct it to the transceiver means, and wherein the fiber side focusing means is configured to receive the optical signal from the fiber optic cable and focus it upon the reflecting means, and to receive the optical signal from the reflecting means and present it to the fiber optic cable;

wherein the fiber side focusing means is configured such that substantially all of the optical signal is transmitted within a 50 μm range at the point of focus of the fiber side focusing means.

6. A fiber optic transceiver means for converting an optical signal received via a fiber optic cable into at least one electrical signal and converting an electrical signal into an optical signal for transmission via the fiber optic cable, comprising:

a transceiver means for receiving and generating the optical signal, wherein the transceiver means comprises an electrical conversion means for converting the optical signal to the electrical signal, and wherein the transceiver means further comprises an optical conversion means for converting the electrical signal into the optical signal; and transmission means attached to the transceiver means and attached to the fiber optic cable, the transmission means having an integral fiber side focusing means positioned adjacent the fiber optic cable, an integral transceiver side focusing means positioned adjacent the transceiver means, and reflecting means positioned between the fiber side focusing means and the transceiver means, wherein the transceiver side focusing means is configured to receive the optical signal from the transceiver and focus it upon the reflecting means, and is further configured to receive the optical signal from the reflecting means and direct it to the transceiver means, and wherein the fiber side focusing means is configured to receive the optical signal from the fiber optic cable and focus it upon the reflecting means, and to receive the optical signal from the reflecting means and present it to the fiber optic cable;

wherein the transceiver side focusing means is configured such that substantially all of the optical signal is received within a 10 μm diameter at the point of focus of the transceiver side focusing means.

* * * * *